United States Patent [19]

Carlson

[11] Patent Number: 4,524,639
[45] Date of Patent: Jun. 25, 1985

[54] EXTENDED FLEXSPLINE ARRANGEMENT
[75] Inventor: John H. Carlson, Danvers, Mass.
[73] Assignee: USM Corporation, Farmington, Conn.
[21] Appl. No.: 507,014
[22] Filed: Jun. 23, 1983
[51] Int. Cl.³ ............................................. F16H 33/00
[52] U.S. Cl. ..................................................... 74/640
[58] Field of Search ................. 74/640, 410, 804, 805, 74/606 R; 220/74

[56] References Cited

U.S. PATENT DOCUMENTS

| | | | |
|---|---|---|---|
| 3,196,713 | 7/1965 | Robinson | 74/640 |
| 3,427,898 | 2/1969 | Mayer | 74/640 |
| 4,216,677 | 8/1980 | Tuzson | 74/640 X |
| 4,365,523 | 12/1982 | Numazawa et al. | 74/606 R |

FOREIGN PATENT DOCUMENTS

| | | | |
|---|---|---|---|
| 578515 | 1/1978 | U.S.S.R. | 74/640 |
| 630467 | 10/1978 | U.S.S.R. | 74/640 |
| 787753 | 12/1980 | U.S.S.R. | 74/640 |

Primary Examiner—Allan D. Herrmann
Assistant Examiner—Stephen B. Andrews
Attorney, Agent, or Firm—Donald N. Halgren

[57] ABSTRACT

A harmonic drive motion transmitting mechanism having a housing encircling a circular spline within which is journalled a flexspline. The flexspline has an annular array of gear teeth thereon, which flexspline has an inner bore having a diameter defined as D. The circular spline also has an annular array of gear teeth mateable with those of the flexspline. A wave generator is mounted within the flexspline. The flexspline has a lip which extends longitudinally beyond the distal edge of its annular array of gear teeth by 10% to 40%D. The lip is of radially thickening dimensions from immediately adjacent the outer edge of the annular array of gear teeth thereon, and from a thickness of about 1%D up to a thickness of about 3%D at the distal edge of said flexspline, to minimize the skewing of the ellipsoidal deflection wave of the flexspline.

5 Claims, 2 Drawing Figures

EXTENDED FLEXSPLINE ARRANGEMENT

BACKGROUND OF THE INVENTION

(1) Field of the Invention

This invention relates to motion transmitting mechanisms, and more particularly to flexsplines for harmonic drive type transmissions.

(2) Prior Art

In harmonic drive transmissions, as may be seen for instance in U.S. Pat. No. 3,789,700 to Cotreau et al, or as initially disclosed in U.S. Pat. No. 2,906,143 to Musser, concentric gears are interengaged at spaced circumferential locations. These locations are advanced by a wave of radial deflection in one of the gearing elements commonly termed a flexspline which reacts on a rigid circular spline. The radial deflection in the flexspline may be caused by a wave generator, generally of ellipsoidal shape, rotating therewithin, the flexspline therefore, generally having an ellipsoidal shape therein, with a major axis arranged across the lobes of the wave generator.

The flexspline has had essentially the same configuration for the past decade, i.e. a thin tubular element adjacent a toothed portion arranged around the open end of the flexspline. This may be seen for instance, in U.S. Pat. No. 3,161,082 to Musser. Other configurations of flexsplines may be seen for example in U.S. Pat. Nos. 3,139,770 to Musser; 3,147,640 to Musser; and 3,311,766 to Scott. Even during development of these patents, it has been known that a torque load applied to the flexspline by the circular spline tends to skew the deflection wave imposed in it by the wave generator. The principle deflection stress in the skewed flexspline is surprisingly not at the major axis of the flexspline where the gear teeth are fully interengaged between the rigid circular spine and the flexspline, but at the location in the flexspline where the maximum change in the radius of curvature occurs, which is just behind the major axis.

The amount of skewing is dependant upon the clearance between the wave generator and the bore of the flexspline along the minor axis, with a loose fitting wave generator, such as that shown in the above-mentioned U.S. Pat. No. 3,161,082 to Musser, allowing the most skewing to occur. In this situation, as a torque load is being applied to the flexspline via the circular spline, the flexspline attempts to wrap itself around the wave generator absent any support in the area of the minor axis, causing skewing of the deflection wave within the flexspline. This uncontrolled deflectional shape in the flexspline introduces rotational displacement which adds additional windup into the system, and increases the deflection stress which is undesirable.

It is an object of the present invention, to provide a flexspline which minimizes skewness therein from standard ellipsoidally shaped wave generators, as well as the double eccentric wave generators.

BRIEF SUMMARY OF THE INVENTION

The present invention includes a harmonic drive flexspline having a closed end and an open end. The flexspline will have an annular array of gear teeth, either internal or external, the latter being the preferred type. The flexspline which is engageable with a typical circular spline, has an integral extension on the open end thereof, outwardly of its annular gear teeth arrangement. The extension outwardly of the gear teeth is about 15% D to 40% D, and preferably about 20% D (D being the inside bore diameter of the flexspline).

The flexspline is of tubular construction, and except at the annular gear arrangement and adjacent lip extension, has a uniform thickness of about 0.8% D between the teeth and the closed end. The extension on the outer edge of the annular gear arrangement increases radially in thickness from about 1.0% D in the area close to the gear teeth to about 2.2% D in the open end. The thickness changes essentially linearly in the extension of the flexspline by the outer side thereof progressing radially outwardly as it approaches its distal edge.

The function of the flexspline extension is to control the deflection wave within the gear tooth portion thereof. Since the shape in the flexspline will tend to maintain its ellipsoidal shape, it also minimizes the skewing of the deflection wave within the gear tooth portion thereof, from its ellipsoidal shape.

The extended flexspline may be utilizable with improved results, such as with higher torque loading before failure on standard elliptical wave generators as well as the aforementioned double eccentric type of wave generators and with improvement in wind-up characteristics especially involving the double eccentric type of wave generators. Additionally, the flexspline may be utilized with a hydraulically formed wave generator where the wave shape imposed on the flexspline is formed by force being applied at discrete locations around the periphery of the flexspline. The wave shape could also be generated by a pneumatic wave generator, or an electro-mechanical system in which the flexspline comprises or has thereadjacent magnetic material to effectuate stepped wave generation in the flexspline. The wave generator may be tri-lobal instead of elliptical, and/or the teeth of the flexspline may be internally disposed in an alternative embodiment with an external arrangement of gear teeth on the circular spline.

BRIEF DESCRIPTION OF THE DRAWINGS

The objects and advantages of the present invention will become more apparent when viewed in conjunction with the drawings, in which.

DESCRIPTION OF THE PREFERRED EMBODIMENT

Figure 1:
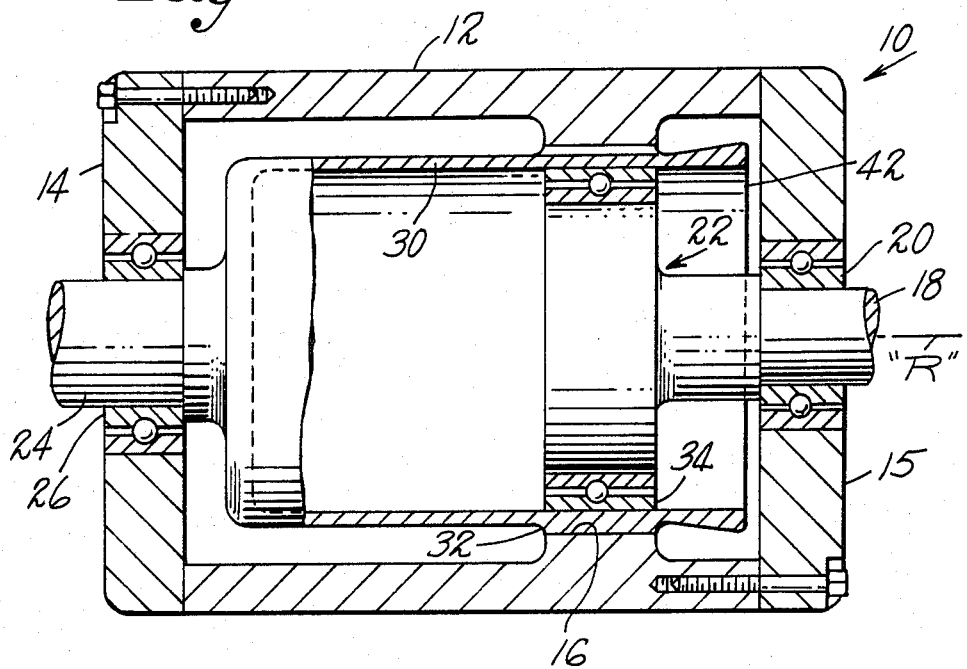
FIG. 1 is a longitudinal sectional view of a harmonic drive type transmission with a flexspline constructed according to the principles of this invention.

Referring now to the drawings in detail and particularly to FIG. 1, there is shown in longitudinal cross-section a harmonic drive transmission 10 having a housing 12, a first and a second end cap 14 and 15, and an internally arranged circular spline 16 within the housing 12. An input shaft 18 is journalled through the second end cap 15 in a bearing 20 having on its inner end, a wave generator assembly 22, in this embodiment, an ellipsoidal generator. Other shapes and/or types of wave generator employing more than two lobes of hydraulic, pneumatic, or even electrical modes, using stepwise energized coils, not shown may be utilized with this invention.

An output shaft 24, is shown journalled through the first end cap 14 in a further bearing 26, its inner end being attached to the closed end of a flexspline 30. The flexspline 30 has an annular outer array of gear teeth 32 enmeshed for at least two portions of its periphery with the gear teeth of the circular spline 16 as is typical of harmonic drive gear engagement. A resilient bearing 34 is disposed between the wave generator assembly 22 and the inside of the flexspline 30.

The flexspline 30 has an open end comprising an elongated portion 42 which extends longitudinally beyond the area of the flexspline 30 which includes its array of gear teeth 32. The elongated portion 42 may extend a length "X" anywhere from about 15% D to about 40% D, where "X" is shown as the extent of elongation in FIG. 2, and D is the diameter of the bore of the flexspline 30.

Figure 2:
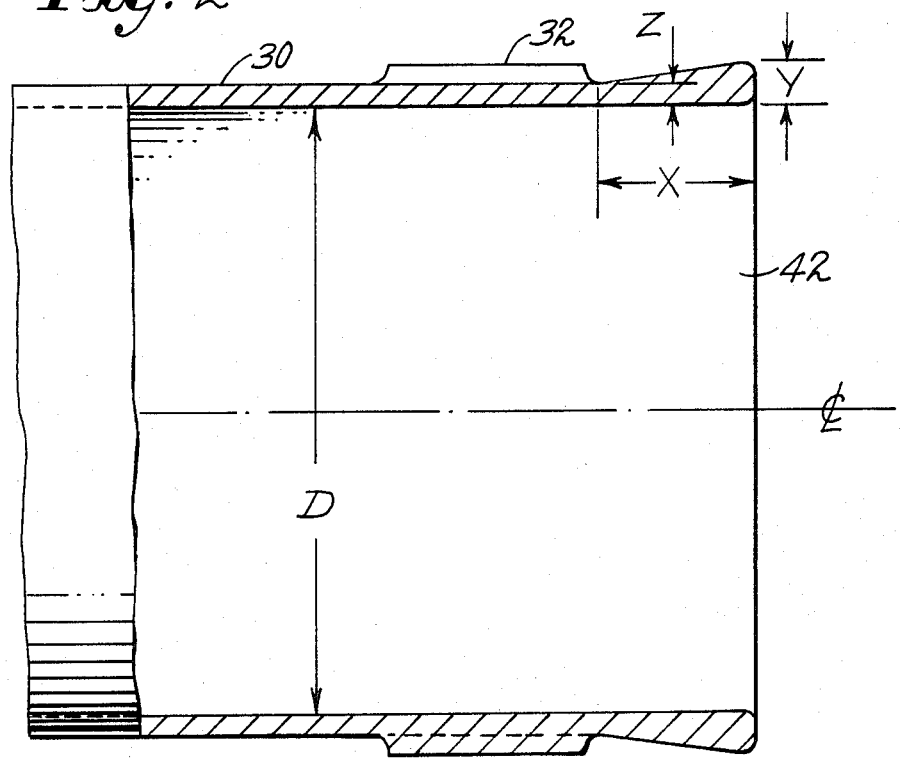
FIG. 2 is an enlarged view of the flexspline showing the proportions of the extension thereof.

The minimum radial thickness of the flexspline 30 is shown in FIG. 2, labelled as "Z". The elongated portion 42 thereof, tapers in gradually increasing radial thickness, outwardly, from an initial radial dimension "Z" which is about 1.0% D to a thickness of about 2.2% D which is shown in FIG. 2, labelled as "Y". The lower limit of "Z" and the upper limit of "Y" define a preferred range of from about 1.0% D to about 3.0% D respectively. The axis of rotation "R" shown in FIG. 1 is coincident with the centerline and shown in FIG. 2.

The parameters involved with this extended, radially thickened flexspline have indicated improved torque loading capabilities of this flexspline whether utilized with regular elliptoidal wave generators, the tri-lobal type, hydraulic or pneumatic wave generation, or electromagnetically induced wave generation.

Torque tests on these extended lip flexsplines have shown that they exceed standard (non-extended lip) flexsplines in Lb.-in. loads before failure, by a factor of about 50%.

The parameters involved with extended radially thickened flexsplines include improved torque-deflection (windup) characteristics of the strain wave gearing assembly. Torque-deflection tests conducted on extended lip and standard flexsplines of the same size and ratio, using wave generators with a constant major axis to control the spline fit-ups, and various clearances at the minor axis, have shown 30% to 50% more windup on the standard flexsplines than on the extended lip flexsplines.

Thus there has been shown an improved flexspline for a harmonic drive type motion transmitting mechanisms, which overcomes the reasons for failure of the prior art flexsplines.

Although the foregoing embodiments have been described with specificity, it is intended that the appended claims are to be interpreted as exemplary only.

I claim:

1. A strain wave gearing assembly for transmitting motion, comprising:
   a housing;
   a circular spline arranged within said housing, said circular spline having an annular array of gear teeth therearound;
   a flexspline rotatably journaled within said housing, said flexspline being of cylindrical configuration and open at last at one end thereof, and having an array of gear teeth therearound, engageable with said gear teeth of said circular spline;
   a wave generating means arranged with said rotatably flexspline so as to provide an advancement deflection wave in the annular array of gear teeth therearound; and
   a shape control means comprising an enlarged distal periphery on the open end of said rotatable flexspline longitudinally outwardly of said annular gear teeth so as to minimize the distortion of the wave shape, thereby minimizing the operating deflection stress within said rotatable flexspline as said deflection wave progresses therearound.

2. A harmonic drive motion transmitting mechanism, as recited in claim 1, wherein said flexspline has a bore diameter D, and said enlarged distal periphery outwardly of said array of gear teeth on said flexspline is of a longitudinal length of between about 10% D up to about 40% D.

3. A harmonic drive motion transmitting mechanism, as recited in claim 2, wherein said enlarged distal periphery of said flexspline has a radial thickness immediately longitudinally outwardly from said annular array of gear teeth of about 1% D, which radial thickness increases towards the distal edge of said flexspline up to a radial thickness of about 3% D.

4. A harmonic drive motion transmitting mechanism, as recited in claim 1, wherein the longitudinal length of said enlarged distal periphery of said flexspline is 20% D.

5. A harmonic drive motion transmitting mechanism, as recited in claim 2, wherein said radial thickness of said enlarged distal periphery of said flexspline increases radially from 1.2% D immediately longitudinally outwardly from said annular array of gear teeth up to a radial thickness of about 2.2% D at the distal edge thereof.

* * * * *